Aug. 26, 1958     A. W. HANSEN     2,849,137
TRACTOR MOUNTED POWER FEEDER FOR BUNK FEEDING
Filed June 4, 1956     2 Sheets-Sheet 1

INVENTOR.
Alfred W. Hansen
BY
Sam J. Slotky
ATTORNEY

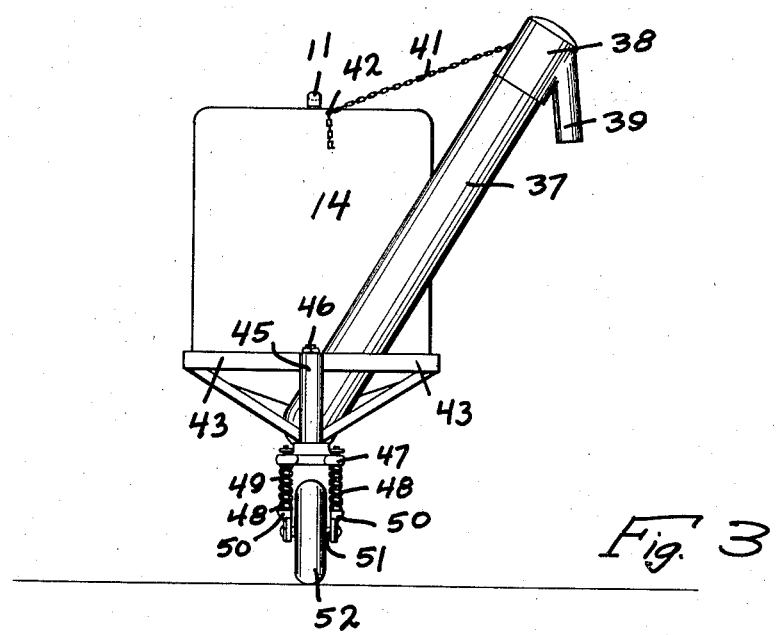

2,849,137
TRACTOR MOUNTED POWER FEEDER FOR BUNK FEEDING

Alfred W. Hansen, Kadoka, S. Dak.

Application June 4, 1956, Serial No. 589,310

1 Claim. (Cl. 214—522)

My invention relates to a tractor mounted feeder which can be drawn from a tractor and which can be used for bunk feeding.

An object of my invention is to provide means whereby the feeder can be pulled rearwardly of the tractor and on the three-point suspension system usually supplied on tractors, and which can be powered from the tractor, and which also will feed sideways along the side of the unit so when the tractor is drawing the unit forwardly it will discharge the feed into lengthened bunkers.

Figure 1:
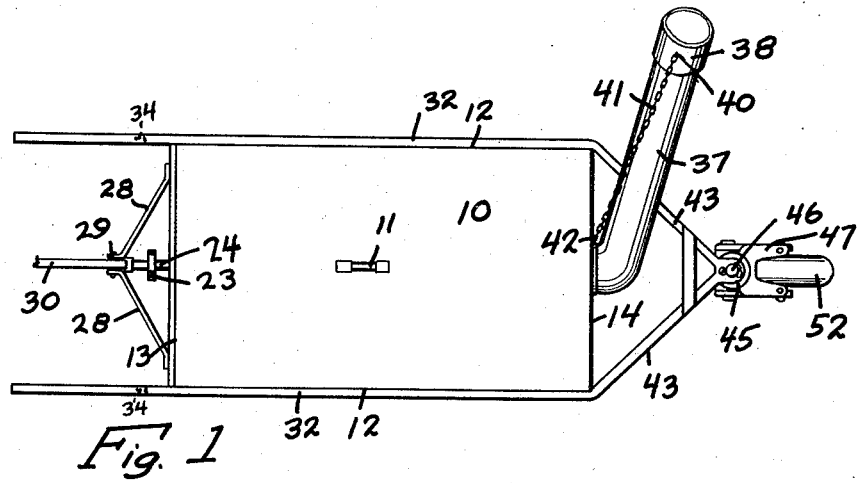
Figure 2:
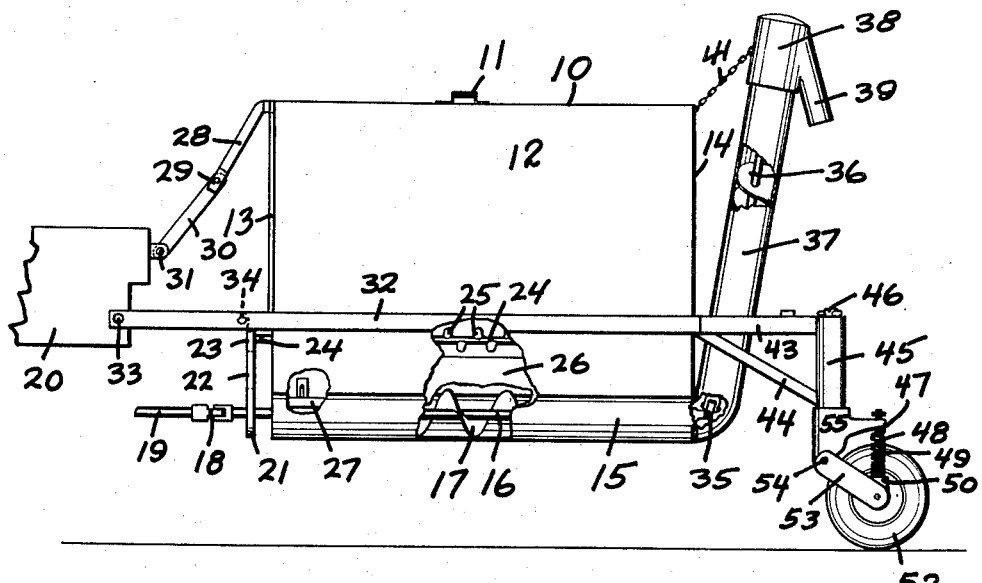

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1 is a plan view of the arrangement,
Figure 2 is a side elevation of Figure 1, and
Figure 3 is a rear view of Figure 1.

My invention contemplates the provision of a feeder which can be filled with feed and then pulled along conveniently by a tractor with attendant means for powering the arrangement so that it can discharge the feed to one side of the unit into lengthened bunks.

I have used the character 10 to designate the lid of the unit, the character 11 indicating the handle, the unit including side walls 12, rear wall 13 and forward wall 14, this providing a hopper into which the feed can be placed. I have further used the character 15 to designate a lower substantially arcuate portion in which is journalled the shaft 16 having the helical conveyor 17, the shaft 16 being connected to a universal joint 18 which is attached to the power take-off shaft 19 of the tractor, the character 20 indicating the rear end of the tractor. The character 21 designates a pulley attached to the shaft 16 over which passes the belt 22 which engages a further pulley 23 which is attached to the shaft 24, which shaft 24 includes a series of small knobs or points 25 to suitably agitate the feed in the hopper, the character 26 indicating a suitable angular divider having the adjustment portion 27.

The character 28 designates a pair of brackets extending downwardly from the wall 13 which are secured at 29 to a bar 30 passing to the mid-point 31 of the three-point suspension system of the tractor, and secured to the sides of the units are the bars 32 which can be attached at 33 to the other two points of the three-point suspension system commonly provided, or which in an alternative construction could be secured at 34 where linkages are employed.

The shaft 16 is attached to a further universal joint 35 which drives a further shaft 36 which is attached to the further conveyor 36a which is positioned within the upwardly and angularly positioned conveyor chute 37 terminating in the cap 38 which includes the downwardly positioned tubular portion 39 which can be swung to the side as shown in Figure 3 for discharging the feed into the bunk. Attached at 40 to the number 38 is the chain 41 which can be attached to a suitable hook at 42 so that adjustable positioning of the angle of the member 37 can be obtained.

The bars 32 terminate in the portions 43 which are braced at 44 and include the journalling member 45 in which is journalled a vertical shaft 46 which is attached to the member 47 which bears against the springs 48 including the stems 49 therein attached to the members 50 having the shaft 51 upon which is journalled the rear wheel 52, the character 53 indicates suitable links pivoted at 54 to the portion 55 (see Figure 2), it being noted that this structure will resiliently support the entire feed hopper.

It will now be noted that above described structure will provide means wherein the feed to be distributed can be pulled along from the rear of a tractor, and using the three-point system, and with attendant means whereby the feed will be discharged to one side of the unit, which is a desired feature inasmuch as the tractor can pull the unit along and through the powering mechanism described, the feed agitated by the agitator member will be carried through the unit, and thence upwardly and to one side where it will be deposited into the long feeder bunk as the tractor travels along the same.

It will also be noted that the unit is resiliently supported at all times. It should be understood that slight modifications can be made without departing from the essential spirit of my invention, and it will now be noted that I have provided the advantages mentioned in the objects of my invention with other advantages being apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A tractor mounted power feeder for bunk feeding comprising a grain receiving hopper, a resiliently mounted wheel journalled rearwardly on said hopper, means for pulling said hopper including a three terminal suspension unit attached thereto adapted to be attached to the three-point rear system of a tractor, said hopper including a lower longitudinally positioned conveyor, means for attaching said conveyor to a tractor rear power take-off shaft, an agitator member positioned above said conveyor and driven by the same, an upwardly and angularly positioned hollow chute communicating with said conveyor for discharging feed to one side of said feeder, said chute including a further conveyor therein, and including a downwardly positioned spout at its upper end, means for adjustably positioning said chute at desired angles.

References Cited in the file of this patent

UNITED STATES PATENTS

| | | |
|---|---|---|
| 2,057,655 | Anthony et al. | Oct. 20, 1936 |
| 2,445,886 | Mulligan | July 27, 1948 |
| 2,653,724 | McBride | Sept. 29, 1953 |
| 2,676,002 | Wolfe | Apr. 20, 1954 |
| 2,676,721 | Hansen | Apr. 27, 1954 |
| 2,743,832 | Kappelmann | May 1, 1956 |